United States Patent [19]

Ajewole et al.

[11] Patent Number: 5,046,118
[45] Date of Patent: Sep. 3, 1991

[54] TONE-SCALE GENERATION METHOD AND APPARATUS FOR DIGITAL X-RAY IMAGES

[75] Inventors: Isaac A. Ajewole, Rochester; Ralph Schaetzing, Pittsford, both of N.Y.

[73] Assignee: Eastman Kodak Company, Rochester, N.Y.

[21] Appl. No.: 475,522

[22] Filed: Feb. 6, 1990

[51] Int. Cl.$^5$ .............................................. G06K 9/36
[52] U.S. Cl. ........................................ 382/51; 382/6; 358/461
[58] Field of Search ............... 358/445, 455, 461, 464, 358/466; 382/50, 51, 54; 364/413.22

[56] References Cited

U.S. PATENT DOCUMENTS

| 4,302,672 | 11/1981 | Kato et al. | |
| 4,641,267 | 2/1987 | Asai et al. | |
| 4,887,305 | 12/1989 | Shimura | 358/51 |
| 4,937,682 | 6/1990 | Dalton | 358/461 |

OTHER PUBLICATIONS

"A New Method for Grey-Scale Picture Thresholding Using the Entropy of the Histogram", by J. N. Kapur et al., Computer Vision, Guidelines and Image Processing, 273-285, 1985.
Entropic Thresholding a New Approach by T. Pern, Computer Graphic & Imaging Processing, 16, 1981, pp. 210-239.

Primary Examiner—Leo H. Boudreau
Assistant Examiner—David Fox
Attorney, Agent, or Firm—William F. Noval

[57] ABSTRACT

In any digital imaging system, the digital input signals must be converted to a visible image on some output material or medium. Because the range of this output medium is usually not the same as the input image range, care must be taken in converting the digital input signals into output signals. This conversion is done via the tone-scale transformation function. The type of tone-scale transformation function used largely determines the quality of the output image. A well designed tone-scale transformation function must ensure good contrast, no clipping and the display of the minimum and maximum densities that are present in the input. This invention deals with a reliable and robust technique of generating the tone-scale transformation function for digital projection X-ray input images. The method is based on the histogram entropy of the input image.

16 Claims, 4 Drawing Sheets

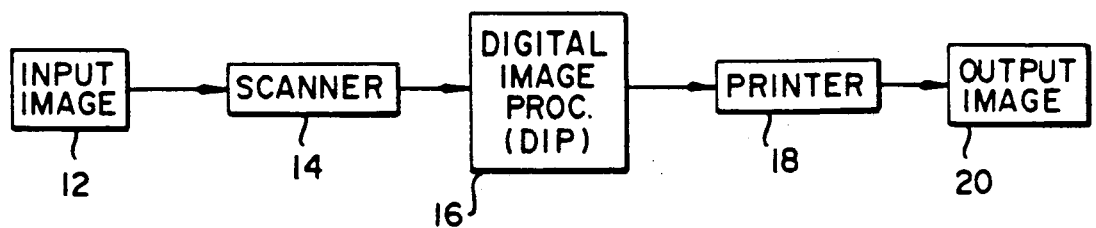
FIG. 1 (PRIOR ART)
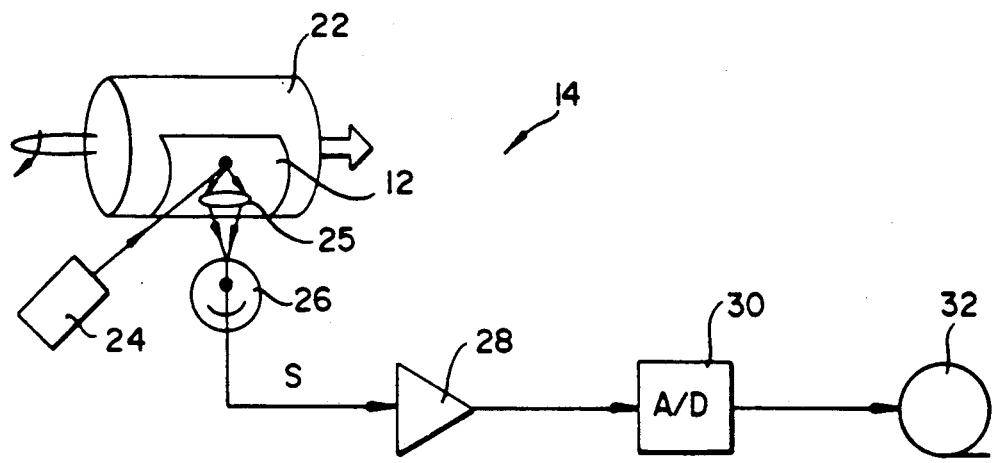
FIG. 2
(PRIOR ART)
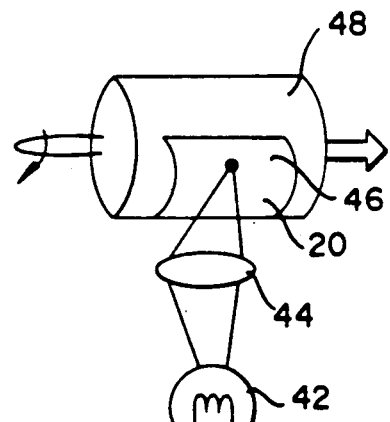
FIG. 3
(PRIOR ART)
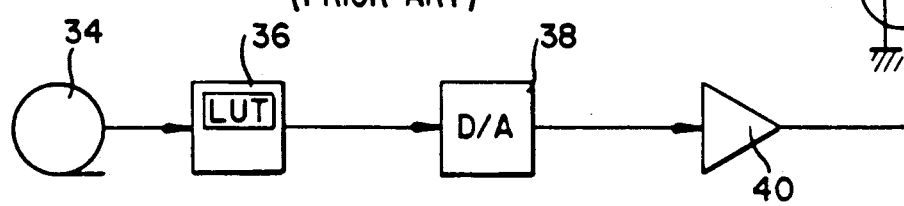

TONE-SCALE GENERATION METHOD AND APPARATUS FOR DIGITAL X-RAY IMAGES

FIELD OF THE INVENTION

The present invention relates to digital image processing and more particularly to method and apparatus for adjusting the tone-scale of a digital x-ray image.

BACKGROUND OF THE INVENTION

Any digital diagnositc x-ray imaging system must be able to produce an output from the digital signals in the form of a visible image on some output medium, e.g., photographic film (hard display), cathode ray tube (soft display). The input that is scanned to generate the digital signals may be film (film-based system), storage phosphor plate (storage-phosphor-based system) or a variety of other digital radiography systems. The digital data may also come from a direct digital input (e.g., computed tomography). For any of these systems, the output image must be of diagnostic quality. The following discussion will concentrate primarily on film-based and storage-phosphor-based systems.

The major obstacle to producing high quality images consistently from either system is that the available dynamic range in the output medium (soft or hard) is generally lower than the dynamic range present in the input image. Typically, the output range is about 2.6 density units for the hard medium and less than 2 decades of intensity for the soft medium; whereas the range of grey levels in the input can be as high as 4.5 density units (decades). Along with this output range insufficiency is the fact that the input grey level distribution (particularly the range of the diagnostically relevant portion of the distribution) depends greatly on the body parts being imaged, the exposure, the modality and the imaging system. The input grey level distribution must therefore be optimally transformed to fit the available output range while at the same time producing a high quality image for diagnosis. This transformation is usually referred to as the tone-scale or gradation correcting transformation. The tone-scale transformation that produces an image of high diagnostic quality must ensure, among other things, good contrast in the region of interest, reasonable contrast in the remainder of the image, no clipping at the low and high ends of the grey level range and no artifacts.

Traditional methods of computing this transformation use gross features (variance, percentile, etc.) of the input histogram. This kind of approach does not always produce acceptable contrast and sometimes produces clipping at the high end of the grey level range. Another method has been described in U.S. Pat. No. 4,302,672 in which an optimal tone-scale transformation function is derived for the PA (postero-anterior) chest image. This is done by identifying the spine, the heart and lung fields of the image and assigning appropriate contrasts to the three different regions. The lung field gets the highest contrast (because this is mostly the region of interest) with the mediastinum region getting the lowest contrast. To make this approach robust, a similar derivation would have to be performed for the image of each common view of every body part. While this could work in theory, it is certainly not an efficient or automatic method because of its dependence on exam-type information to process each image.

As a way of getting around this problem, another method of generating a tone-scale transformation function has been described in U.S. Pat. No. 4,641,267. In this method, designed for computed radiography, a few reference tone-scale transformation functions are generated. In order to obtain the tone-scale transformation function for a particular input image, one of the reference functions is selected (depending on the body part) and this function is shifted and rotated by amounts depending on the exposure and other parameters of the image. While this method avoids generating and storing a large number of tone-scale transformation functions a priori, it is (1) not an automatic and totally adaptive method, (2) is not robust with respect to different imaging systems and exposures and (3) may be completely inapplicable to imaging modalities other than computed radiography. Also a certain amount of storage and a priori information are still needed to make the method work.

There is presently a need for an automatic method and apparatus for generating a tone-scale transformation function that is adaptive to images and imaging systems. The needed method should also be robust with respect to imaging systems and exposures.

SUMMARY OF THE INVENTION

The objective of this invention is to provide a method of and apparatus for automatically and adaptively generating tone-scale transformation functions that are robust with respect to imaging systems, exposure conditions, and body parts.

Another object of the present invention is to provide a method of and apparatus for generating tone-scale transformation functions which obviates the need to store a number of reference transformation functions.

The steps involved in using this method consist of:
1. Forming a histogram of the digital input image;
2. Dividing the histogram into a region of interest and a background region;
3. Constructing a tone scale transformation function having a linear portion substantially over the region of interest smoothly joined with a first portion extending from the start of the histogram to the linear portion and a second portion extending from the linear portion to the beginning of the background region.

This method depends entirely on the histogram of the input image, hence it is adaptive and robust.

BRIEF DESCRIPTION OF THE DRAWINGS

FIG. 1 is a block diagram showing prior art apparatus for performing digital imaging processing;

FIG. 2 is a block diagram of a typical radiation image scanning system for generating a digital image;

FIG. 3 is a block diagram of a typical radiation image printing system in which the tone-scale adjustment according to the present invention is performed;

DESCRIPTION OF THE PREFERRED EMBODIMENTS

Figure 4:
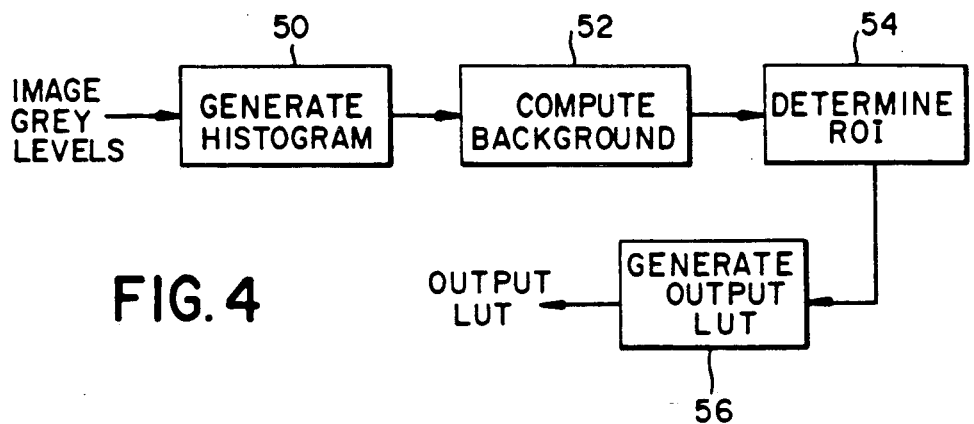
FIG. 4 is a block diagram illustrating the tone-scale adjusting method of the present invention.

FIG. 1 is a block diagram showing apparatus for performing digital image processing. An input image 12 which may be a conventional X-ray image of the type obtained from a film/screen combination system; or a latent image, of the type obtained from a storage-phosphor based system is scanned on a scanner 14 to produce a digital image which is processed (e.g. for edge enhancement, noise removal, etc.) in a Digital Image Processor (DIP) 16. The output of the DIP 16 is then sent to a printer 18 which produces an output image 20.

FIG. 2 shows a scanner 14 of the type which is applicable to a storage-phosphor based system. On this scanner, the latent input image in a storage phosphor sheet 12 mounted on a rotating drum 22 is scanned by a laser beam from a laser 24 and the light emitted by the phosphor sheet 12 is imaged by a lens 25 onto a photodetector 26 and is converted by the photodetector 26 into an electric signal S. The signal S is amplified by an amplifier 28 and digitized by an A/D converter 30. The resulting digital image signal is then either stored, for example, on a magnetic tape 32 or sent directly to the DIP 16 for processing. A scanner for a film based system is similar to that described above except that the light is transmitted through the image bearing input film and collected by the photodetector 26.

FIG. 3 is a block diagram showing a printer, in which the method and apparatus of this invention are embodied. The output of the DIP 16 which may have been stored on a magnetic tape 32 is passed to a tone-scale generator/processor 36 which produces a look-up table that is used to transform the digital image. The transformed digital image is then converted into analog signal by an amplifier D/A converter 33. This analog signal is amplified by an amplifier 40 which drives a recording light source 42. The output of light source 42 is imaged by a lens 44 to expose a photosensitive medium such as a photographic film 46 mounted on a drum 48 to produce the output image 20. The film printer in FIG. 3 is shown only by way of example. The present invention may also be employed with other types of printers such as thermal and electrophotographic printers.

In a preferred embodiment, the method of this invention is practiced in the tone-scale processor 36. FIG. 4 shows a block diagram of the steps implemented in this processor 36. The tone-scale processor can physically reside in the DIP 16, or in the printer 18, and is preferrably embodied in a programmable microprocessor. In operation, a histogram of the processed image (i.e. DIP output) is generated 50 as is known in the prior art. From this histogram, a grey level, $X_B$, representing the background grey level of the image is computed 52. Using the histogram and the background grey level $X_B$, a region of interest (ROI) is determined 54. A tone-scale transformation curve is then computed and put in the form of a look-up table (LUT) 56. These steps are described in further detail below:

1. Determining the Background Grey Level $X_B$

An accurate determination of the grey level $X_B$ representing the background is pivotal to the derivation of the tone-scale transformation curve. From this subset of grey levels, the grey level beyond which all other grey levels are to be printed to the highest density is determined. If this grey level is set too low, clipping will occur; if set too high, contrast at the high end of the grey scale will suffer and the background may not be at the highest density.

Figure 5:
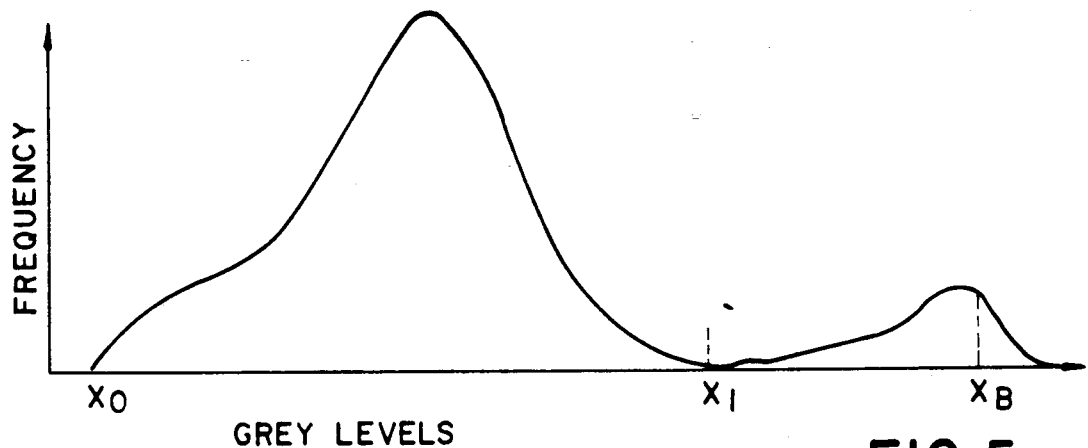
FIG. 5 shows a histogram of a typical projection X-ray image.

FIG. 5 shows a histogram of typical diagnostic medical image from either a screen-film system or a storage phosphor based system. The region from grey level $X_0$ to $X_1$ of the histogram represents the region where most of the diagnostic information resides; region $X_1$ to $X_B$ represents the grey level distribution of the soft tissues in the image; the region beyond $X_B$ represents the background or the least absorbing portion of the image. The objective of locating the background is to determine $X_B$.

The first step in determining $X_B$ is to approximately threshold the image into foreground and background using the histogram. The method used to do this assumes that the histogram consists of two modes and determines the grey level $X_B'$ which separates these two modes, by maximizing the a posteriori entropy of the image as is known in the prior art and disclosed in J. N. Kapur, et al., "A new method for gray-level picture thresholding using the entropy of the histogram," Computer Vision, Graphics and Image Processing, 29 1985, pp. 273-285. Briefly, this method is described as follows, Let $\{p_i, i=0, \ldots, M-1\}$ be the normalized histogram of the image where M is the total number of grey levels. Then, if $X_B'$ is the boundary between the foreground and background, the entropies of the foreground and background ($H_F$ and $H_B$) are respectively:

$$H_F = -C_F \sum_{i=0}^{X_B'} p_i \ln p_i \quad (1)$$

$$H_B = -C_B \sum_{i=X_B'+1}^{M-1} p_i \ln p_i \quad (2)$$

where $$C_F = \frac{1}{\sum_{i=0}^{X_B'} p_i} \quad (3)$$

$$C_B = \frac{1}{\sum_{i=X_B'+1}^{M-1} p_i} \quad (4)$$

The a posteriori entropy $H_A$, given $X_B'$ is $$H_A = H_F + H_B \quad (5)$$

The method chooses the $X_B'$ that maximizes $H_A$.

The grey levels beyond $X_B'$ represent approximately the background grey levels. This region can be refined further. The further refinement is done by modeling the grey level distribution between $X_B'$ and $M-1$ as a uniform distribution, using this model to obtain a new set of grey levels for the background and continuing this process until a certain criterion is met as described below. This model uniform distribution is chosen such that its entropy is substantially the same, i.e. the same as or some fixed fraction of the entropy of the background distribution (i.e. $H_B$). The entropy of a uniform distribution of width W is given by $$H_N = \ln W \qquad (6)$$

Thus $$H_N = H_B \rightarrow W = \exp(H_B) \qquad (7)$$

Having computed the width W of the model uniform distribution, the location of the distribution is determined. The criterion used in placing this distribution is that of "maximum probablility within a window"; i.e. choose the subset of W contiguous grey levels in the range $(X_B', M-1)$ with the greatest number of pixels. Because of the nature of the histograms of X-ray images, this location will be at either the low end or high end of the region $(X_B', M-1)$. An upper end location represents a very good estimate of the background grey levels. A low end location strongly implies that this subset of grey levels belongs more in the foreground than in the background and should therefore be removed from consideration, thereby creating a new set of background grey levels $(X_B'', M-1)$. This process is repeated until either the location of the model uniform distribution is at the upper end of the region or the percentage of the number of pixels within the window is less than 0.1. $X_B$, the grey level beyond which all grey levels are printed to highest density, is taken as the average of the grey levels within the final window.

Figure 6:
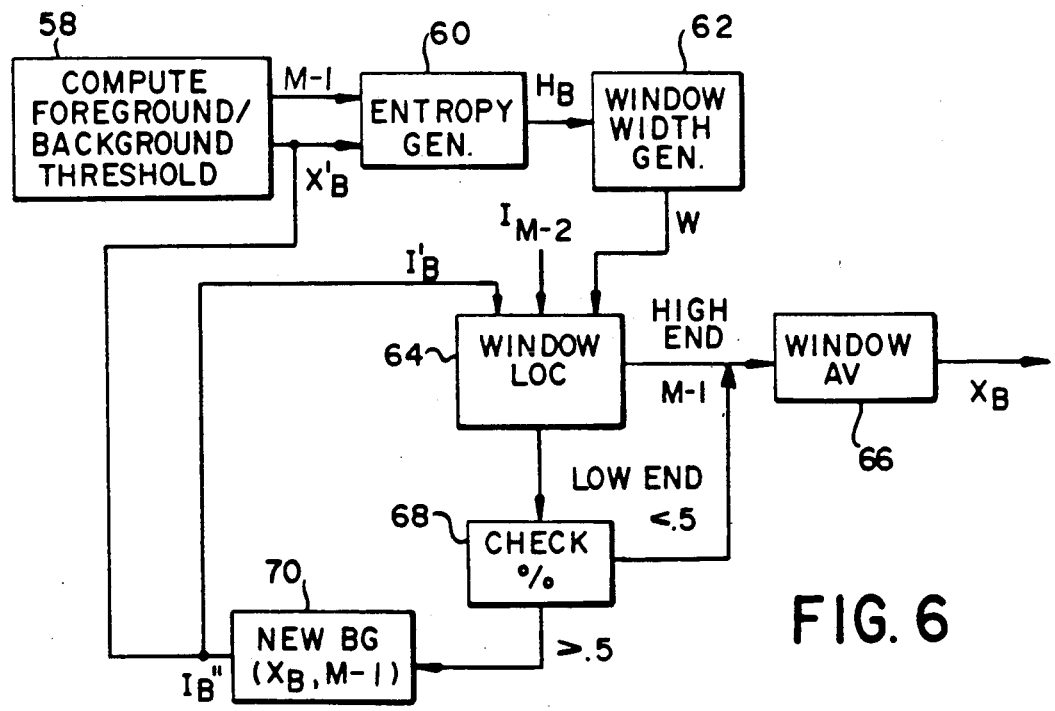
FIG. 6 is a block diagram illustrating the steps of locating the background component of the image according to the present invention.

FIG. 6 is a block diagram showing the above described sequence of steps. First the threshold $X_B'$ between the foreground and background is computed 58. Next, the entropy $H_B$ for the grey levels in the region $(X_B', M-1)$ is computed 60. The width W of a uniform distribution corresponding to the entropy $H_B$ is computed 62. This window (of width W) is located at either the low or high end of region $(X_B', M-1)$ 64. If the location is at the high end, the window average $(X_B)$ is computed 66 as the average of the grey levels within the window. If the location of the window is at the low end of the region $(X_B', M-1)$ the percentage of pixels having grey levels within the window is checked 68 and if the percentage is less than 0.5, the window average $X_B$ is computed 66 as the average of the grey levels within the window. In the event that the location is at the low end and the percentage of pixels having their grey levels within the window is greater than 0.5, the grey levels within the window are eliminated from the set $(X_B', M-1)$ to produce a new set $(X_B'', M-1)$ of the background grey levels 70. The whole process, from the entropy generation on, is now repeated with the new region $(X_B'', M-1)$ until the window average $X_B$ can be computed.

2. Generation of the Region of Interest (ROI)

Having determined the background grey level $X_B$, the region $X_0$ to $X_1$ hereafter referred to as the region of interest (ROI) is identified. The process of identifying this region is basically a thresholding operation, based on certain criteria.

The criterion used is such that as the background portion of the image diminishes, the threshold approaches the leading edge of the distribution, since most of the information in this case will be diagnostically relevant. This means that traditional approaches to background thresholding as discussed in T. Pun, "Entropic Thresholding: A new approach," Computer Graphics and Image Processing 16, 1981 pp. 210-239, J. N. Kapur, et al., "A new method for gray-level picture thresholding using the entropy of the histogram," Computer Vision, Graphics and Image Processing 29, 1985, pp. 273-285, are not applicable in this case since the threshold given by such techniques approaches the center of support of the histogram as the background diminishes.

Other well known techniques that use gross features of the histogram (e.g. mean, variance, percentile, etc.) to threshold the image do not perform satisfactorily and robustly because of the wide variety of histograms that can result from different body parts and different imaging systems.

Therefore, the criterion of determining the threshold according to the present invention is based on a more comprehensive feature of the histogram and is such that the threshold tends to be the end of the histogram as the background becomes smaller and smaller. The criterion is dictated by the kind of transformation one intends to use over the region of interest. According to the present invention, a linear transformation is employed over the region of interest to preserve the results of any previous image processing (e.g. edge enhancement, noise removal, etc.) that was done on the image. Linear transformation is the ideal transformation when the histogram of the image is a uniform distribution. Thus, the next step after background identification is to model the image histogram as a uniform histogram of certain width and mean using some statistical criterion. The criterion takes into account the fact that the region of interest is the most populated region of the image once the background has been isolated. This is to ensure that the model uniform distribution defines the diagnostically relevant region.

One possible criterion for modeling the histogram is the Minimum Mean Squared Error (MMSE) criterion. With this criterion, the goal is to choose a histogram width w and to minimize the mean of the square of the error between the actual image cumulative distribution and the model uniform distribution. While this gives satisfactory results, it is computionally intensive.

A preferred approach employs the entropy $H_I$ of the image histogram to calculate the width of the histogram. The goal is to choose w, the width of the model uniform distribution, to be such that the entropy $H_N$ associated with this uniform distribution equals $H_I$, the entropy of the image histogram. Let $\{p_i, i=0, \ldots X_B\}$ be the renormalized image histogram in the range of gray-levels from 0 to $X_B$. Then $$H_I = -\sum_{i=0}^{X_B} p_i \ln p_i \qquad (8)$$

$$H_N = \ln w \qquad (9)$$

the width w is obtained by setting $H_N = H_I$, i.e. $w = \exp(H_I)$.

To complete the model, a window of width w is placed at the appropriate (according to some criterion) location on the grey level scale. Similar to the procedure for determining the background disclosed above, we use the criterion of maximum probability within the window, i.e. choose the location with the maximum number of pixels within the window. Due to the nature of the histogram, this location will either be at the low end or at the high end of the grey level scale. The low end location represents the region of interest. In the event that the location is at the high end, we obtain the average grey level $X_{av}$ within the window and repeat the above described process represented by equations (8) and (9) and continue the process until the window is located at the low end of the grey scale.

Figure 7:
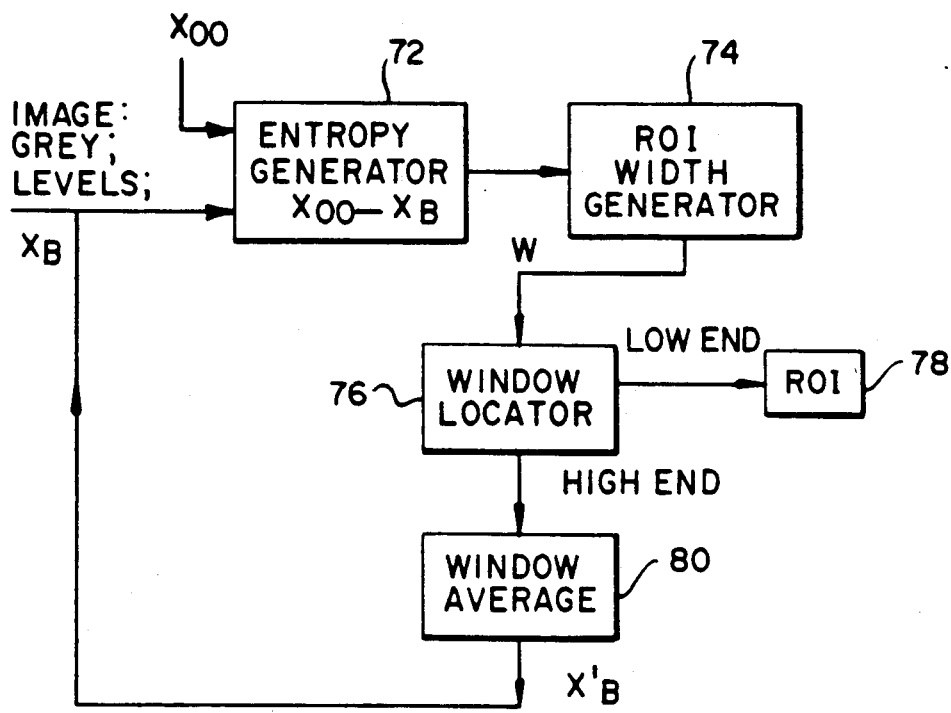
FIG. 7 is a block diagram showing the steps performed in identifying the Region of Interest (ROI) component of an image according to the present invention.

FIG. 7 is a block diagram illustrating the steps in locating the region of interest. First the entropy of the histogram is computed 72 using the image grey levels between $X_{00}$ and $X_B'$ computed as described above, where we define $$X_{00} = \min(100, X_{10}) \tag{10}$$

$X_{10}$ = 10-th percentile of the histogram $$X_{B'} = \begin{cases} X_B \text{ on the first pass} \\ X_{av} \text{ on subsequent passes} \end{cases}$$

Next, the width w of the region of interest ROI is calculated 74. A window corresponding to width w is located 76. If the window is at the low end of the histogram, the window is taken as the ROI 78. If the window is at the high end of the histogram, the pixel values in the windows are averaged to produce a new average $X_B'$ and the process is repeated over the new range ($X_{00} \rightarrow X_B'$), until the window is located at the low end of the histogram. The end of the window $X_1$ is given by $$X_1 = X_{00} + w. \tag{11}$$

GENERATION OF THE OUTPUT LOOK-UP TABLE

Figure 8:
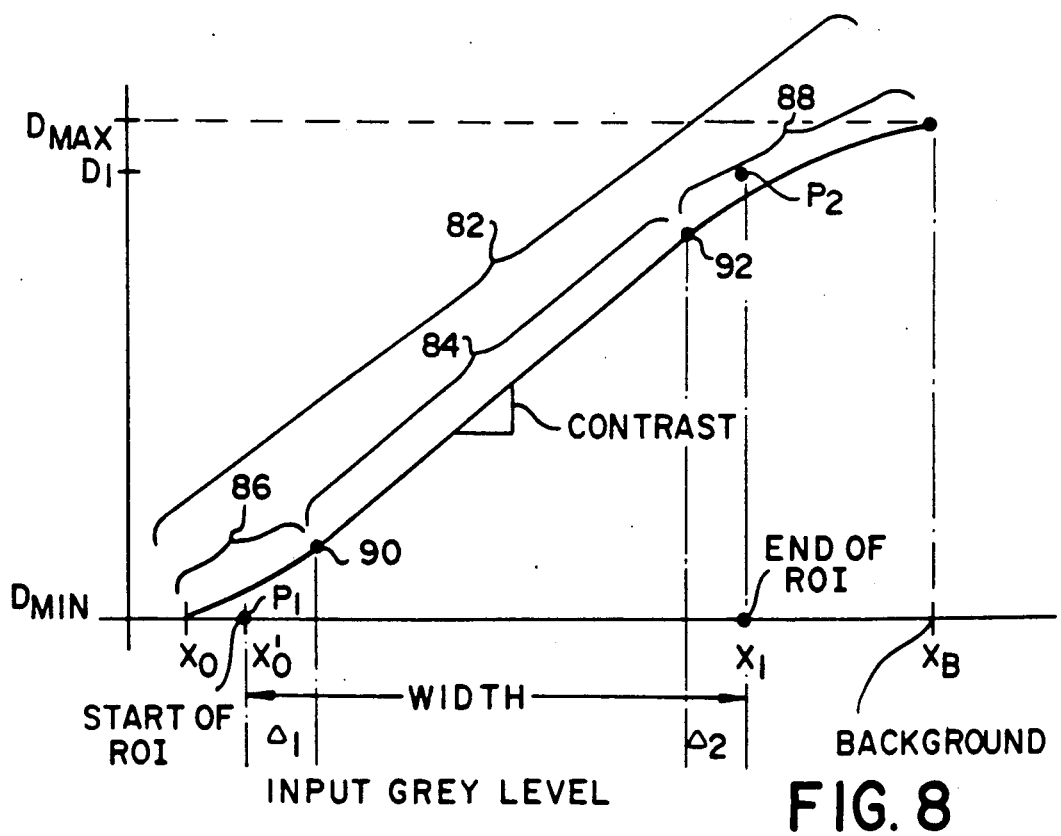
FIG. 8 is a graph illustrating a typical tone-scale transformation function generated according to the present invention.

The output look-up table representing the tone-scale transformation function is now derived, based on the width w and location of ROI. The tone-scale transformation function generated according to the present invention is shown in FIG. 8 where the ordinate represents the required output density and the abscissa represents the input grey level. The tone-scale transformation function 82 consists of a linear segment 84 over substantially all of the region of interest. The linear segment is generated by a line between a point $P_1$ representing the start of the region of interest at $D_{min}$, and a point $P_2$ representing the end of the region of interest at a density $D_1$ determined as described below. The linear segment 84 is smoothly joined with a first segment 86 over a grey level region starting at the start of the histogram and smoothly joined at point 90 to the linear segment 84 to within $\Delta_1$ of the start of the region of interest. Similarly, a segment 88 is smoothly joined to the linear segment 84 at point 92 within $\Delta_2$ of the end of ROI and extends to $D_{max}$ at the background grey level $X_B$. Segment 84 is chosen to be linear to preserve the micro structures of the image after it has been processed by the DIP 16; segments 86 and 88 can be linear or non-linear.

The slope of the linear segment 84 and hence the value $D_1$ is determined by setting the average and variance of the output image density over the ROI equal to some values which are empirically determined from a statistical study of many satisfactorily toned images. Let $D(X)$ be the output density as a function of $X$, the input grey level. Then for the linear model (over the ROI)

$$D(X) = \begin{cases} f_1(X), X_0 < X < X_0' + D_1 \\ f_2(X), X_1 - \Delta_2 < X < X_b \end{cases} \tag{12}$$

where $$\gamma = \frac{D_1 - D_{min}}{X_1 - X_0'}$$

is the slope of the straight line $D_{min}$ is the minimum density achievable in the output image; and $f_1(X)$, $f_2(X)$) represent the segments 86 and 88 respectively.

The nonlinear functions $f_1(X)$ and $f_2(X)$ are chosen so that there is functional and slope continuity at the break points 90 and 92, respectively. The funciton $f_2(X)$ depends on both $D_1$, the density aim at the end of the ROI, and $D_{max}$, the maximum density achievable in the output image, while the function $f_1(X)$ depends on $D_{min}$ and on the relative positions of $X_0$ and $X_0'$. There are a number of known curve fitting methods that can be used for generating these nonlinear regions. Since each function must satisfy two boundary conditions on its value and one on its slope, three parameters are needed in the fit. Thus, a general quadratic fit can be used. We have found empirically that a parabola povides the best visual impression in the images generated with this method. Alternatively, it is also possible to use histogram equalization (see for example W. K. Pratt, DIGITAL IMAGE PROCESSING, Addison Wesley, 1978) to generate these sections. Taking the average and variance of equation (12) over the linear portion of the ROI gives $$D_{av} = \gamma(X_{av} - X_0') + D_{min} \tag{13}$$

$$D_{var} = \gamma X_{var} \tag{14}$$

where
  $D_{av}$ = average density of output image over linear portion of the ROI
  $D_{var}$ = variance of output image over linear portion of the ROI
  $X_{av}$ = average grey level of input image linear portion of the ROI
  $X_{var}$ = variance of grey level of input image over linear portion of the ROI.

Equations (13) and (14) represent two equations in four unknowns. By selecting aim values for $D_{av}$ and $D_{var}$, based on statistical analysis of a large variety of images, these equations can be solved for $\gamma$ and $X_0'$:

$$\gamma = D_{var}/X_{var} \tag{15}$$

$$X_0' = X_{av} - \frac{D_{av} - D_{min}}{\gamma} \tag{16}$$

Typically the value of $D_{av}$ is in the range of 0.7–0.8, while the value for $D_{var}$ lies in the range of 0.33–0.37. (These solutions are only approximations in the case where $X_0' < X_0$).

Figure 9:
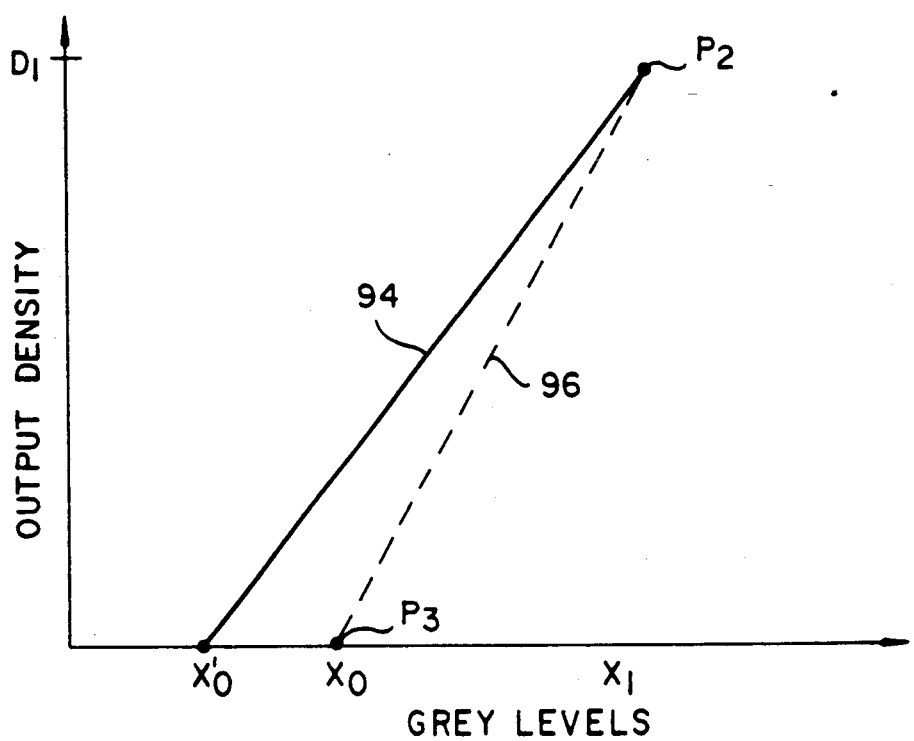
FIGS. 9 and 10 are graphs useful in describing the steps of defining the linear segment of the tone-scale transformation function according to the present invention.

There are two possibilities for $X_0'$: $X_0' < X_0$ and $X_0' \geq X_0$. The case $X_0' < X_0$ is depicted in FIG. 9 in which 94 represents a line of slope $\gamma$ obtained as described above.

To ensure that $D_{min}$ is reproduced in the output image, the slope of this line 94 is adjusted about point $P_2$ to intersect point $P_3$ at $X_0$ as shown by dotted line 96. The resulting slight increase in variance and decrease in average density is negligible.

Figure 10:
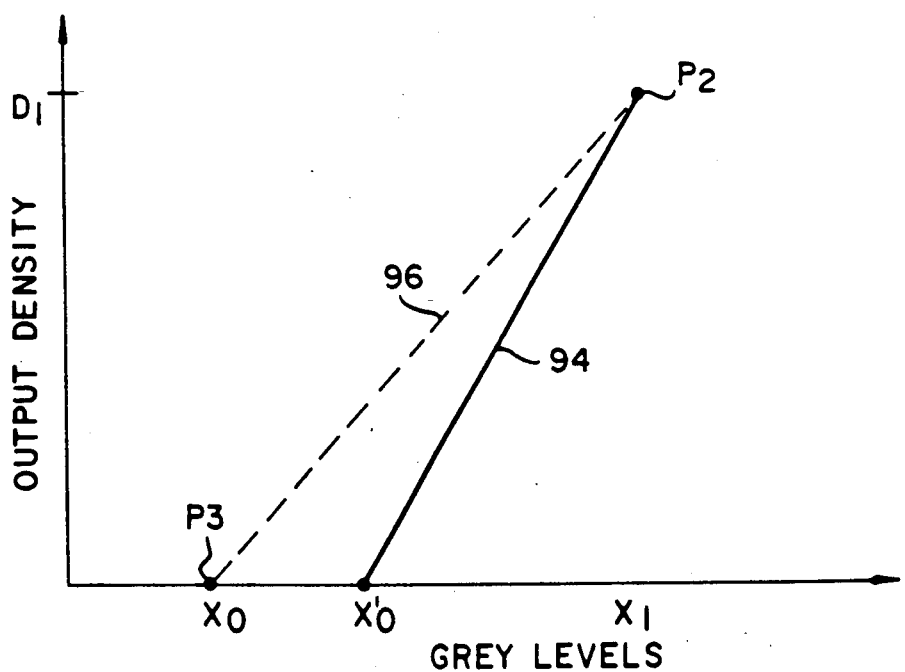

FIG. 10 represents the case $X'_0 > X_0$. Line 94 is the straight line obtained as described above. The slope of this line is adjusted about point $P_2$ to intersect point $P_3$ at $X_0$ as shown by dotted line 96 to ensure reproduction of $D_{min}$ in the output image. The slightly higher average density and lower variance from the target values are insignificant.

INDUSTRIAL APPLICABILITY AND ADVANTAGE

The present invention is useful in digital image processing and particularly in digital processing of medical diagnostic x-ray images. The invention is advantageous in that tone-scale of an output image is automatically adjusted for a large family of images without the need to store a variety of tone-scale functions, and without the need for human intervention to select a desired tone-scale reproduction function. In particular the processing method automatically adapts to many different examination types such as chest, gastrointestinal, skull, and extremities without operator intervention.

We claim:

1. A method of processing a digital diagnostic X-ray image comprising the steps of:
   a. in a digital computer, generating a tone-scale transformation function by,
      i forming a histogram of the digital image;
      ii dividing the histogram into a region of interest and a background region by;
         (a) assuming the histogram is comprised of two modes; and
         (b) determining the grey level that separates the two modes by maximizing the a posteriori entropy of the image by;
            (i) modeling the background grey level distribution as a uniform distribution having substantially the same entropy as the background distribution, and computing the width W of the model uniform distribution;
            (ii) determining the location of a window of width W with the greatest number of pixels in the background region; and
            (iii) if the window is located at the upper end of the background distribution choosing the beginning of the window as the start of the background, else compute a new window based on the average of the grey levels in the window, until the window is located at the upper end of the background distribution, and choosing the beginning of the new window as the start of the background;
      iii constructing a tone-scale transformation function having a linear portion substantially over the region of interest, smoothly joined with a first portion extending from the start of the histogram to the linear portion, and a second portion extending from the linear portion to the beginning of the background region; and
   b. transforming the digital image with the tone-scale transformation function.

2. The method claimed in claim 1 further comprising the steps of:
   prior to transforming the digital image with the tone-scale transformation function, processing the image with an operator.

3. A method of processing a digital diagnostic X-ray image comprising the steps of:
   a. in a digital computer, generating a tone-scale transformation function by,
      i forming a histogram of the digital image;
      ii dividing the histogram into a region of interest and a background region by;
         (a) modeling the region of interest of the histogram as a uniform distribution having substantially the same entropy as the region of interest and computing the width w of the model uniform distribution;
         (b) determining the location of a window of width w with the greatest number of pixels in the region of interest; and
         (c) if the window is located at the low end of the region of interest, choosing the window as the region of interest, else compute a new window based on the average of the grey levels in the window, until the window is located at the low end of the region of interest, and choosing the new window as the region of interest;
      iii constructing a tone-scale transformation function having a linear portion substantially over the region of interest, smoothly joined with a first portion extending from the start of the histogram to the linear portion, and a second portion extending from the linear portion to the beginning of the background region; and
   b. transforming the digital image with the tone-scale transformation function.

4. Apparatus for processing digital diagnostic X-ray images, comprising:
   a. means for generating a tone-scale transformation function having:
      i means for generating a histogram of the digital image;
      ii means for dividing the histogram into a region of interest, and a background region by determining the grey level that separates two modes of the histogram by maximizing the a posteriori entropy of the image, said dividing means including,
         (a) means for modeling the region of interest of the histogram as a uniform distribution having substantially the same entropy as the region of interest and computing the width w of the model uniform distribution;
         (b) means for determining the location of a window of width w with the greatest number of pixels in the region of interest; and
         (c) means for choosing the window as the region of interest if the window is located at the low end of the region of interest, else computing a new window based on the average of the grey levels in the window until the window is located at the low end of the region of interest, and choosing the new window as the region of interest;
      iii means for generating a linear portion of the tone scale transformation function substantially over the histogram region of interest, and for generating a first portion smoothly joining the linear portion, and extending from the beginning of the histogram, and a second portion extending from the linear portion to the background region of the histogram;

b. means for generating a look-up table representing the tone-scale transformation function; and c. means for processing the digital image by addressing the look-up table.

5. The method claimed in claim 1 or 3, wherein the steps of constructing a tone-scale transformation function further comprises the steps of generating the linear portion of the function by determining a slope that will cause the average density and variance of the output image in the region of interest to be equal to preselected target values.

6. The method claimed in claim 5 wherein the preselected target values are in the range 0.7–0.85 and 0.3–0.4, respectively, for the average density and variance.

7. The method claimed in claim 6, wherein the preselected target values are 0.78 and 0.35 respectively, for the average density and variance.

8. The method claimed in claim 1 or 3, wherein the first and/or second portion of the tone-scale reproduction function defines a parabola.

9. The method claimed in claim 1 or 3, wherein the first and/or second portions of the tone-scale reproduction function defines a straight line smoothly connected to the linear portion by a parabola.

10. Apparatus for processing digital diagnostic X-ray images, comprising:

a. means for generating a tone-scale transformation function having:

i means for generating a histogram of the digital image;

ii means for dividing the histogram into a region of interest, and a background region by determining the grey level that separates two modes of the histogram by maximizing the a posteriori entropy of the image said dividing means including;

(a) means for modeling the background grey level distribution as a uniform distribution having substantially the same entropy as the background distribution, and computing the width W of the model uniform distribution;

(b) means for determining the location of a window of width W with the greatest number of pixels in the background region; and (c) means for choosing the beginning of the window as the start of the background, if the window is located at the upper end of the background distribution else computing a new window based on the average of the grey levels in the window, until the window is located at the upper end of the background distribution, and choosing the beginning of the new window as the start of the background;

iii means for generating a linear portion of the tone scale transformation function substantially over the histogram region of interest, and for generating a first portion smoothly joining the linear portion, and extending from the beginning of the histogram, and a second portion extending from the linear portion to the background region of the histogram;

b. means for generating a look-up table representing the tone-scale transformation function; and c. means for processing the digital image by addressing the look-up table.

11. The apparatus claimed in claim 10, further comprising means for processing the image with an operator prior to transforming the digital image with the tone-scale transformation function.

12. The apparatus claimed in claim 10 or 4, wherein the means for constructing a tone-scale transformation function further comprises means for generating the linear portion of the function by determining a slope that will cause the average density and variance of the output image in the region of interest to be equal to preselected target values.

13. The apparatus claimed in claim 12 wherein the preselected target values are in the range 0.7–0.85 and 0.3–0.4, respectively, for the average density and variance.

14. The apparatus claimed in claim 12, wherein the preselected target values are 0.78 and 0.35 respectively, for the average density and vaiance.

15. The apparatus claimed in claim 10 or 4, wherein the first and/or second portion of the tone-scale reproduction function defines a parabola.

16. The apparatus claimed in claim 10 or 4, wherein the first and/or second portions of the tone-scale reproduction function defines straight line connected to the linear portion by a parabola.

* * * * *